A. L. SCHRAM.
GATHERING POOL FOR GLASS TANKS.
APPLICATION FILED DEC. 18, 1908.

938,518.

Patented Nov. 2, 1909.

Witnesses:
George Radson
May Geary

Inventor,
Alexander L. Schram.
by Ralph Kalish Atty.

UNITED STATES PATENT OFFICE.

ALEXANDER L. SCHRAM, OF HILLSBORO, ILLINOIS.

GATHERING-POOL FOR GLASS-TANKS.

938,518.   Specification of Letters Patent.   Patented Nov. 2, 1909.

Application filed December 18, 1908. Serial No. 468,164.

*To all whom it may concern:*

Be it known that I, ALEXANDER L. SCHRAM, a citizen of the United States, residing at Hillsboro, county of Montgomery, and State of Illinois, have invented a certain new and useful Improvement in Gathering-Pools for Glass-Tanks, of which the following is a specification, reference being had to the accompanying drawings, forming a part of this specification, in which—

Figure 1:
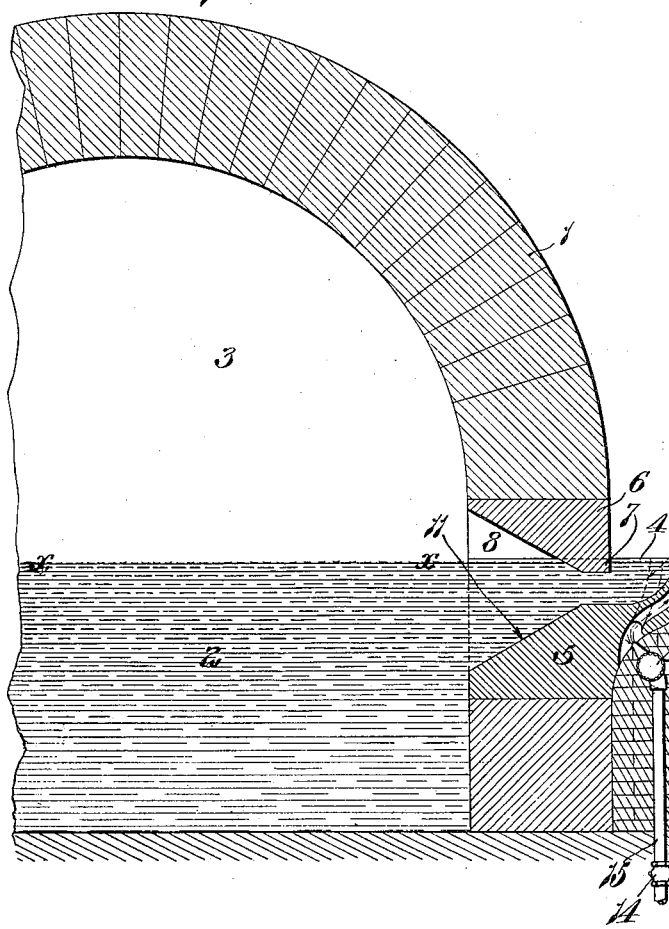
Figure 4:
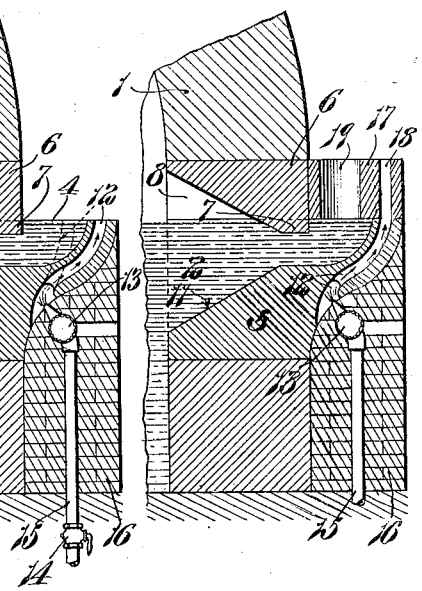
Figure 2:
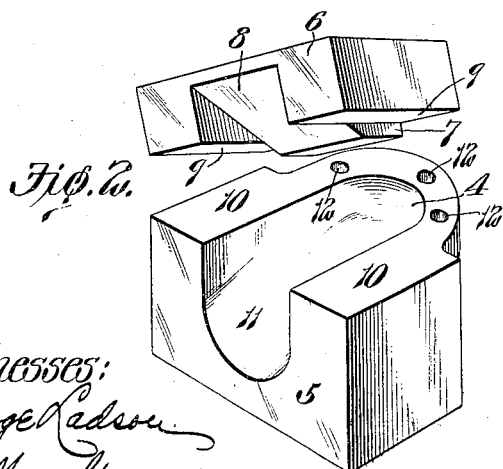
Figure 3:
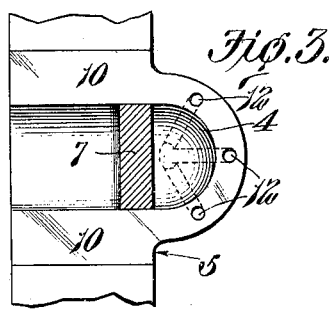

Figure 1 is a vertical sectional view through a portion of a glass-tank, showing, also in vertical section, my improved gathering-pool in connection therewith; Fig. 2 is a perspective view of the gathering-pool blocks detached from the tank; Fig. 3 is a plan view of the gathering-pool basin block, showing in cross-section the depending lip or lug of the gathering-pool upper block in coöperative relation to said basin block; and Fig. 4 is a fragmentary vertical sectional view of the glass-tank, showing, also in vertical section, the gathering-pool with a perforated cover-block thereon.

This invention relates to a new and useful improvement in gathering-pools for glass tanks.

The objects of my invention are to so construct or provide glass-tanks with gathering-pools on the outside, but having communication with the interior, thereof, so that the molten or fluid glass in condition to be worked may be readily and easily obtained; to provide means for sealing the outlet-opening from the tank to the said pool, whereby, although the flow of molten or fluid glass from the tank into said pool is not interfered with or hindered, the hot air or gas within said tank and upon the body of molten glass therein for maintaining the same in a condition of fluidity is prevented from escaping from said tank through said opening and the entrance of cold or atmospheric air through said outlet-opening into said tank, which cold or atmospheric air would tend to reduce the temperature of said hot air or gas and chill or harden said body of molten glass, is prevented; and to provide in or about said gathering-pool means whereby the glass therein is maintained in a fluid or plastic condition to be easily worked as required.

With these objects in view, my invention consists in the novel parts and in the novel construction, arrangement, and combination of the same, all as will hereinafter be described and afterward pointed out in the claims.

The glass, as is usual, is first melted in a glass-furnace, not shown. In said furnace the glass is melted to a condition of perfect fluidity and the scum and other impurities are removed or settle at the bottom of the furnace. From this furnace the fluid glass flows through a suitable opening therein into tank 1, the body of molten glass in tank 1 being indicated by the numeral 2. The flow of glass from said furnace into tank 1 may be regulated by suitable valves or other means, and the body of molten glass 2 in tank 1 is usually and preferably maintained at a constant level, called the glass-line $x$—$x$, while the furnace is in operation, the upper part 3 of tank 1 being supplied or charged with hot air or gas, so as to keep the body of glass 2 in a fluid state and in condition to be worked. In order that quantities of such glass sufficient for the use to which the same is to be put may now be readily and easily taken from tank 1, I provide or arrange outside the wall of said tank, but in communication with the interior thereof, one or more of my gathering-pools 4. Each of these pools comprises a basin-block 5 and what might be called a deflector or sealing block 6, both said blocks being preferably of refractory material. The block 6 is provided at its outer middle portion with a depending projection or lip 7 adapted to extend downwardly a short distance into the concavity or basin of block 5, for purposes hereinafter appearing. Block 6 is also under-cut or chamfered, as at 8, in and from the middle rear portion thereof, preferably at an angle, toward and terminating at the lip 7, the side portions 9 of block 6 being adapted to rest on the sides 10 of block 5 when the said blocks are arranged in coöperative relation. The rear portion of the concavity in the basin-block 5 is inclined downwardly and inwardly, as at 11, so that when said blocks 5 and 6 are in position, an inwardly flaring opening into the pool 4 is provided in the wall of tank 1, the upper end of said inclined wall 11 being preferably and substantially in alinement with the lip of block 6. The blocks 5 and 6 are adapted to be built in or otherwise embedded in the side wall of tank 1 and are preferably so positioned therein that the upper face or top of basin-block 5 is substantially on a level with the glass-line $x$—$x$, whereby there is maintained a steady supply of molten or fluid glass in the pool 4, the glass flowing easily and in a comparatively heavy mass into said pool 4 through the said flaring opening thereinto. The depending lip 7 of block 6 now projecting downwardly into the body or mass of molten glass at the rear of pool 4 forms or provides a seal, which effectively prevents the entrance of the outer cold air into said tank 1 through the opening into pool 4, whereby the temperature within said tank is not reduced, and also effectively prevents the escape of the hot air or gas from within said tank to the exterior, so that the condition or state of the body of glass 2 is not affected by having said outlet-opening into said pool in direct communication with the interior of said tank. The under-cut or chamfered wall or side of block 6 enables the hot air or gas in tank 1 to be deflected or applied upon the glass close to the outlet opening into the pool 4, and due to the inclined wall 11 of block 5, and the gradually decreasing depth of the concavity in block 5 leading into said pool, a substantially heavy stream or mass of molten glass is brought directly to said outlet-opening into said pool 4, whereby the glass as it enters pool 4 is prevented from becoming sticky, or lumpy and is in a substantially perfect condition to be worked as desired, the glass being adapted to be taken from the pool 4 by suitable tools or means in quantities sufficient for the purpose or use to which the glass is to be put. In order now to maintain this condition of the glass while in the pool 4 and to prevent the glass while therein from hardening, I preferably provide flues 12 in said basin-block 5 around the periphery of pool 4, into which flues are admitted, and through which are passed, products of combustion preferably from an oil or gas fuel burner 13 provided and arranged so as to supply the heat to said flues in any desirable manner and as clearly shown in Figs. 1 and 4. The flame from the burner 13 may, of course, be regulated by a suitable valve 14 and a fuel supply-pipe 15, as is well understood. If desired, the burner 13 and supply-pipe 15 and also the outer portion or wall of pool 4, as shown in Figs. 1 and 4, may be incased by a protecting brick or other wall 16, although this wall may be dispensed with. Thus, by means of the products of combustion from burner 13 passing into and through the flues 12, the inner surface of pool 4 is heated and the glass within the pool is maintained in a plastic or molten state, in order that when taken therefrom it may be satisfactorily worked.

In some instances, if desired, I may provide for the pool 4, as shown in Fig. 4, a perforated cover-block 17, which is provided with flue-openings 18, adapted to register with flues 12 in block 5, in order to permit the exit of the products of combustion therefrom, and with a central opening 19, through which the gathering tool may be inserted to take or remove from pool 4 the desired quantity of glass.

By my construction, it is thus seen that I provide a gathering-pool on the outside of the glass-tank from which the desired quantities of fluid or plastic glass may be readily and easily taken, the glass as it enters said pool and while in said pool being kept or maintained in a substantially perfect molten or fluid state to be satisfactorily worked.

It is, of course, understood that the blocks 5 and 6 may be made in varying sizes, as desired, for various sized tanks; that the cover-block 17 may be made in varying sizes to fit various sized pools; that the diameter of the central opening in said cover-block may be regulated to accommodate different kinds of gathering-tools; that cover-blocks having central openings of various diameters or sizes may be interchangeably used on the same pool; and also that other minor changes in the arrangement and construction of the several parts of my pool may be made and substituted for those herein shown and described without departing from the nature and principle of my invention.

Having thus described my invention, what I claim and desire to secure by Letters Patent is:

1. A glass-tank having an outlet opening of gradually decreasing size in its wall and a gathering-pool on the outside of said tank and in communication with said outlet opening; substantially as described.

2. A glass-tank having an outlet opening in its wall and a gathering-pool on the outside of said tank in communication with said outlet opening, said opening gradually decreasing in size toward the exterior of said wall and the top of said gathering-pool being on a plane above the top of said outlet opening at the exterior of said wall; substantially as described.

3. A glass-tank having a gathering-pool in communication with the interior thereof, said gathering-pool comprising a hollowed block adapted to be fixedly arranged in the wall of said tank and having a concaved portion projecting outside thereof; substantially as described.

4. A glass-tank having a gathering-pool in communication with the interior thereof, said gathering-pool comprising a block adapted to be arranged in the wall of said tank and having a concaved portion projecting outside thereof, the bottom wall of said block being downwardly inclined from said concaved portion toward the interior of said tank; substantially as described.

5. A glass-tank having a gathering-pool in communication with the interior thereof, said gathering-pool comprising a concaved block adapted to be arranged in the wall of said tank and having a portion projecting outside thereof, the depth of the concavity in said outwardly-projecting portion being less than the depth of said concavity at the inner end of said block; substantially as described.

6. A gathering-pool for glass-tanks, the same comprising a concaved block having an outwardly-projecting portion, the depth of said concavity in said outwardly-projecting portion being comparatively shallow and the depth of the concavity in said block gradually increasing from said shallow portion toward the rear of said block; substantially as described.

7. A glass-tank having a gathering-pool arranged on the exterior thereof, an outlet-opening in its wall leading to said gathering-pool, said outlet-opening gradually decreasing in size from the inner side of said wall toward the outer side thereof, and a depending lip at the outer side of said wall projecting into said pool at the rear thereof; substantially as described.

8. A glass-tank having a gathering-pool in communication with the interior thereof, said gathering-pool comprising a basin-block adapted to be arranged in the wall of said tank said block having a concaved portion projecting outside of said tank and a hollowed portion of gradually increasing depth from said concaved portion toward the interior of said tank, and an upper block adapted to be arranged in the wall of said tank above and in coöperative relation to said basin-block and having a depending lip portion adapted to project into the concavity in said basin-block at the rear of said outwardly-projecting portion thereof; substantially as described.

9. A glass-tank having a gathering-pool in communication with the interior thereof, said gathering-pool comprising a concaved basin-block adapted to be arranged in the wall of said tank and having a concaved portion projecting outside thereof, the concavity in said outwardly-projecting portion terminating in a downwardly-inclined bottom wall, whereby the concavity in said block gradually increases in depth from said outwardly-projecting portion toward the rear of said block, and an upper block adapted to be arranged in the wall of said tank above and in coöperative relation to said basin block, said upper block having a bottom wall inclined inwardly and upwardly from said outwardly-projecting portion of said basin-block; substantially as described.

10. A glass-tank having a gathering-pool in communication with the interior thereof, said gathering-pool comprising a basin-block adapted to be arranged in the wall of said tank, said basin-block having a concaved portion projecting outside the wall of said tank and the rear portion of said block being hollowed and inclined downwardly from said outwardly-projecting concaved portion, and a top block adapted to be arranged in the wall of said tank above and in coöperative relation to said basin-block, said top block having a depending lip adapted to project into the rear of the concavity in said outwardly-projecting portion of said basin-block and said top block having its under side chamfered and inclined upwardly from said depending lip; substantially as described.

11. A glass-tank having a gathering-pool on the outside thereof, an outlet-opening in its wall leading to said gathering-pool, said outlet-opening being of larger size at the inner side of said wall than at the outer side thereof, and means for heating said gathering-pool; substantially as described.

12. A glass-tank having a gathering-pool on the outside thereof, an outlet-opening in its wall leading to said gathering-pool, said outlet-opening being of larger size at the inner side of said wall than at the outer side thereof and the top of said gathering-pool being on a plane above the top of said outlet-opening at the outer side of said wall, and means for heating said gathering-pool; substantially as described.

13. A glass-tank having an inwardly-flaring outlet-opening in its wall, of gradually decreasing size toward the outside of said tank a gathering-pool on the outside of said tank and in communication with said outlet-opening, and means for heating said gathering-pool; substantially as described.

14. A glass-tank having a gathering-pool in communication with the interior thereof, said gathering-pool comprising a block adapted to be arranged in the wall of said tank and having a concaved portion projecting outside thereof, and a hollowed portion of gradually increasing depth from said concaved portion toward the interior of said tank and means for heating the inner surface of said concaved outwardly-projecting portion; substantially as described.

15. A glass-tank having a gathering-pool in communication with the interior thereof, said gathering-pool comprising a block adapted to be arranged in the wall of said tank said block having a concaved portion projecting outside of said tank and a hollowed portion of gradually increasing depth from said concaved portion toward the interior of said tank, heat-conducting flues in said concaved outwardly-projecting portion, and means for supplying heat to said flues; substantially as described.

16. A glass-tank having a gathering-pool in communication with the interior thereof, said gathering-pool comprising a block adapted to be arranged in the wall of said tank said block having a concaved portion projecting outside of said tank and a hollowed portion of gradually increasing depth from said concaved portion toward the interior of said tank, and a perforated cover-block for said concaved outwardly-projecting portion; substantially as described.

17. A glass-tank having a gathering-pool in communication with the interior thereof, said gathering-pool comprising a concaved block adapted to be arranged in the wall of said tank and having a concaved portion projecting outside thereof, heat-conducting flues in said concaved outwardly-projecting portion, means for supplying heat to said flues and a perforated cover-block for said concaved outwardly-projecting portion; substantially as described.

18. A glass-tank having an outlet-opening in its wall, said outlet-opening being of larger size at the inner side of said wall than at the outer side thereof, a gathering-pool arranged on the outside of said tank and in communication with said outlet-opening, and a depending lip in the wall of said tank adapted to project into said pool at the rear thereof, the top of said pool being on a plane above the top of said outlet-opening at the outer side of said wall; substantially as described.

19. A glass-tank having an outlet-opening in its wall, said outlet-opening being of gradually decreasing size toward the outer side of said wall and the top of said outlet-opening at the inner side of said wall being above the glass-line of said tank, a gathering-pool arranged on the outside of said tank and in communication with said outlet-opening, and a depending lip in the wall of said tank adapted to project into said pool at the rear thereof, the top of said pool being on a plane above the top of said outlet-opening at the outer side of said wall and being substantially on a level with the glass-line of said tank; substantially as described.

20. A glass-tank having an inwardly-flaring outlet-opening in its wall, the top of said outlet-opening at the inner side of said tank being above the glass-line of said tank, a gathering-pool arranged on the outside of said tank and in communication with said outlet-opening, and a depending lip in the wall of said tank at the mouth of said outlet-opening adapted to project into said pool at the rear thereof, the top of said pool being on a plane above the top of the mouth of said outlet-opening and being substantially on a level with the glass-line of said tank; substantially as described.

21. A glass-tank having an inwardly-flaring outlet-opening in its wall, the top of said outlet-opening at the inner side of said tank being above the glass-line of said tank, a gathering-pool arranged on the outside of said tank and in communication with said outlet-opening, a depending lip in the wall of said tank at the mouth of said outlet-opening adapted to project into said pool at the rear thereof, the top of said pool being on a plane above the top of the mouth of said outlet-opening and being substantially on a level with the glass-line of said tank, and means for heating said gathering-pool; substantially as described.

22. A glass-tank having a gathering-pool arranged on the outside thereof, the top of said pool being substantially on a level with the glass-line of said tank, and an outlet-opening in its wall leading into said pool, said opening being of gradually decreasing size from the interior of said tank toward said pool, the top of said opening at the interior of said tank being above the level of said glass-line and the top of the mouth of said opening at said pool being below said glass-line; substantially as described.

In testimony whereof, I have signed my name to this specification in the presence of two subscribing witnesses.

ALEXANDER L. SCHRAM.

Witnesses:
MAY GEARY,
EUGENE D. FRY.